Aug. 4, 1931.  C. D. LAKE ET AL  1,817,631
DUPLICATING GANG PUNCH
Filed Oct. 21, 1925  15 Sheets-Sheet 1

Inventors
Clair D. Lake
and
Ralph E. Page
By their Attorneys
W. W. Wilson

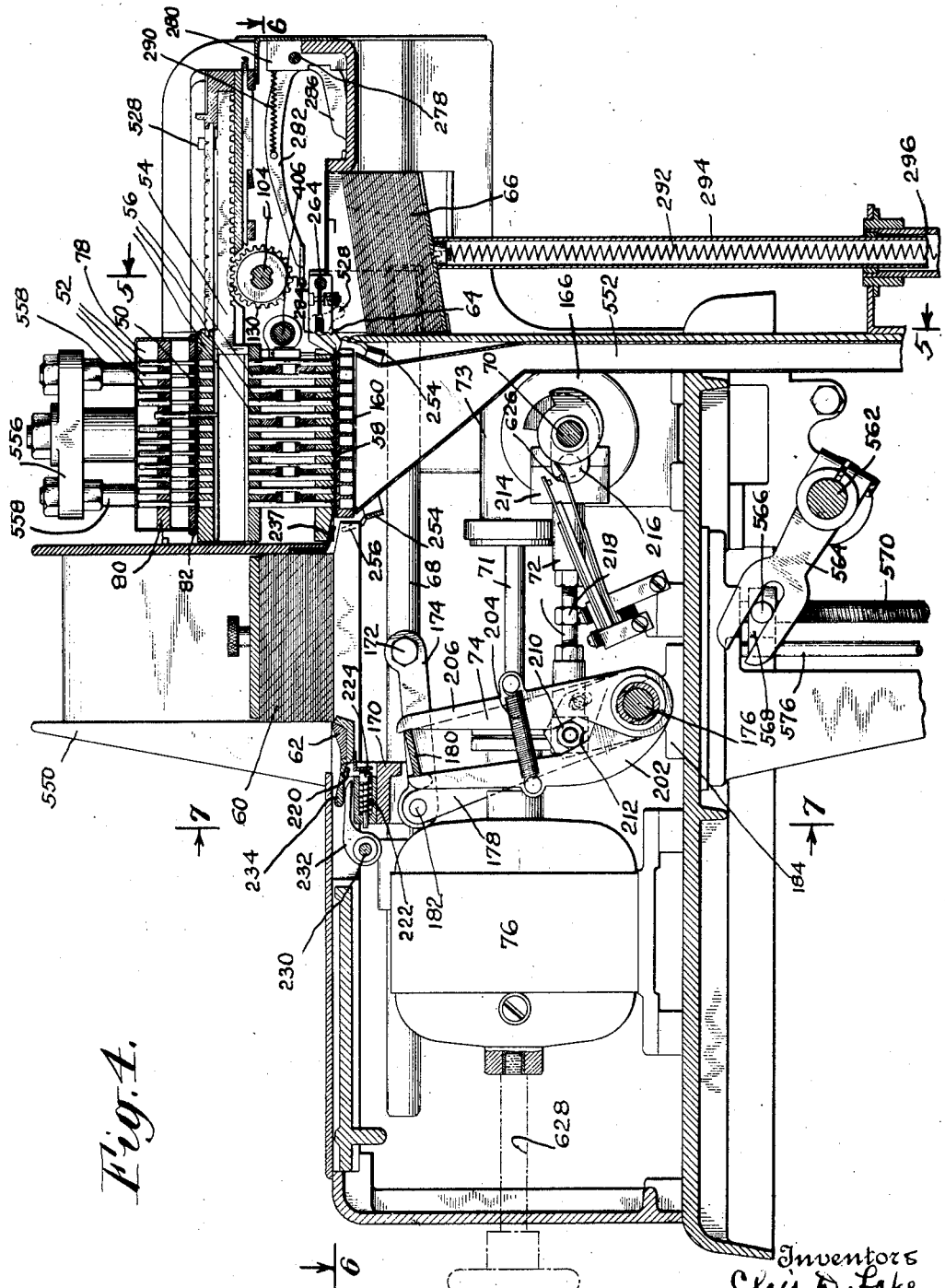

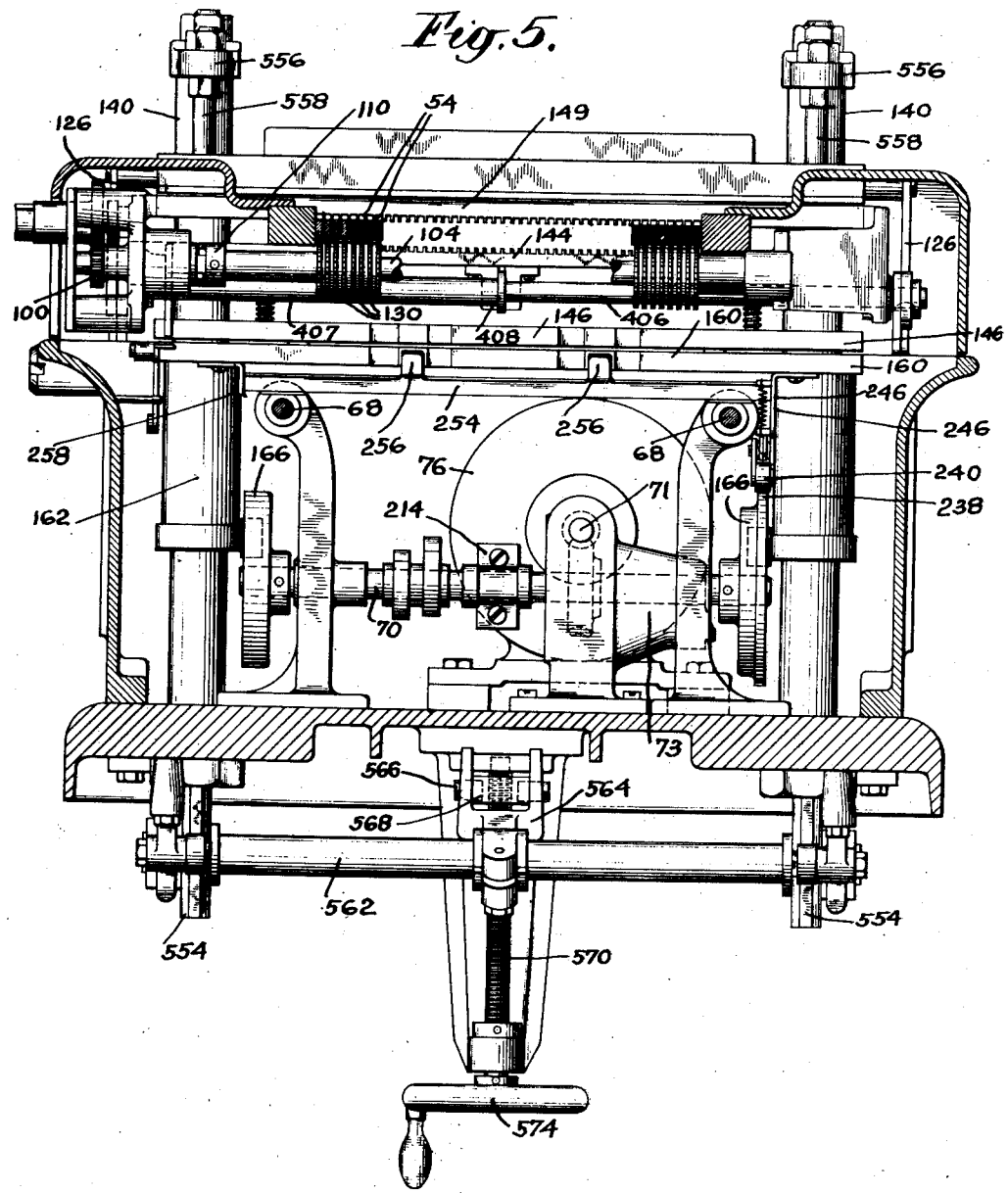

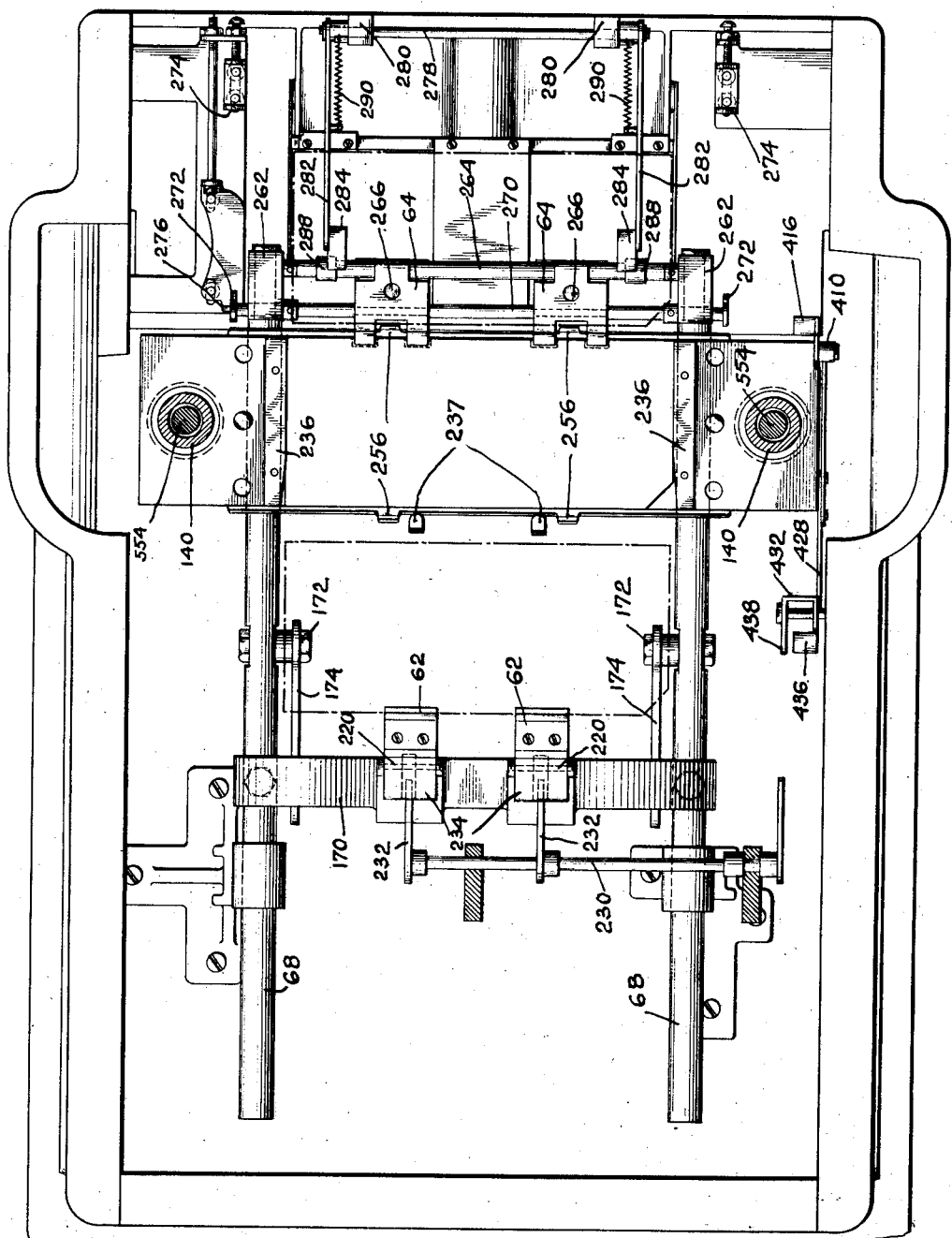

Aug. 4, 1931.  C. D. LAKE ET AL  1,817,631
DUPLICATING GANG PUNCH
Filed Oct. 21, 1925  15 Sheets-Sheet 7
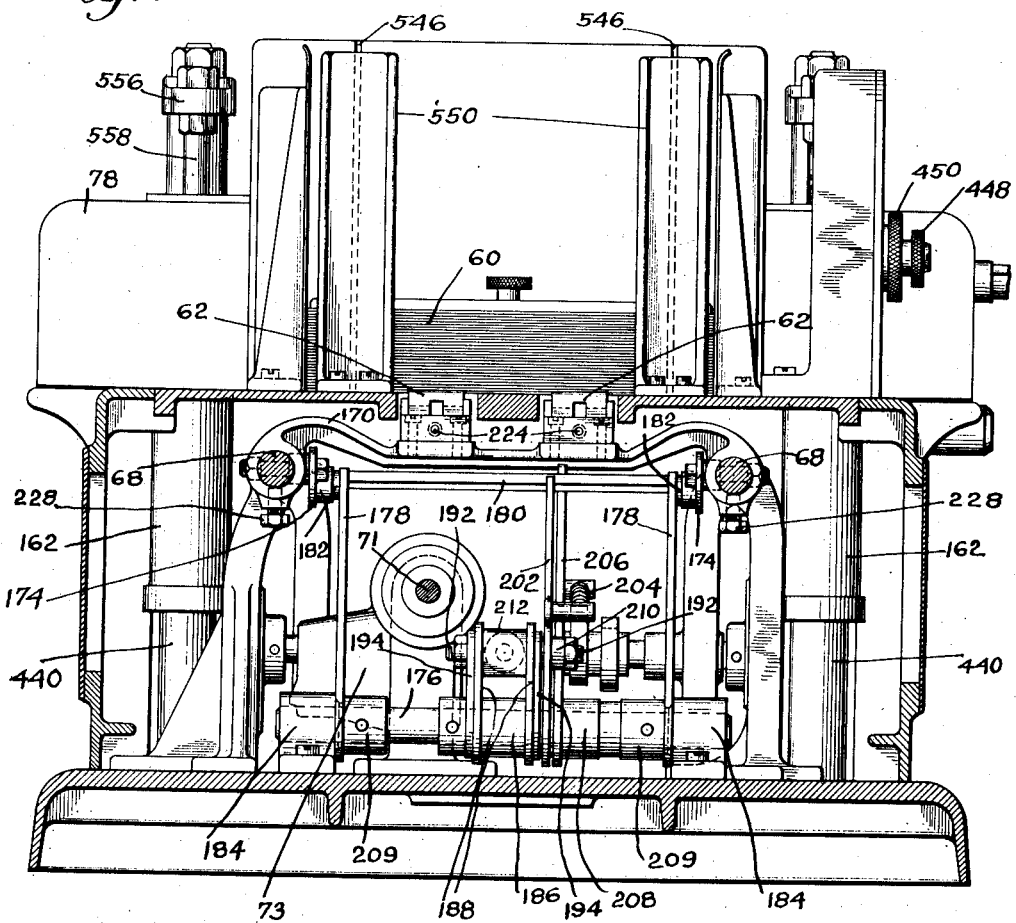
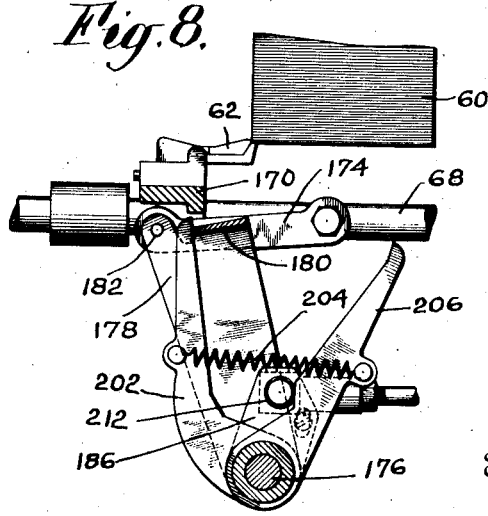
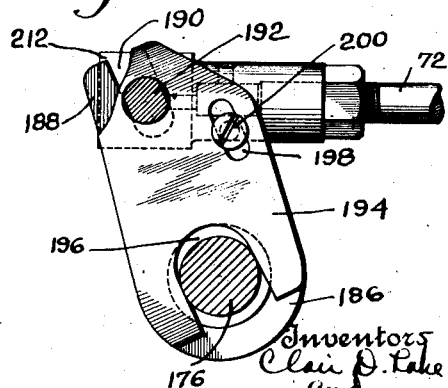

Aug. 4, 1931.        C. D. LAKE ET AL        1,817,631
DUPLICATING GANG PUNCH
Filed Oct. 21, 1925        15 Sheets-Sheet 8
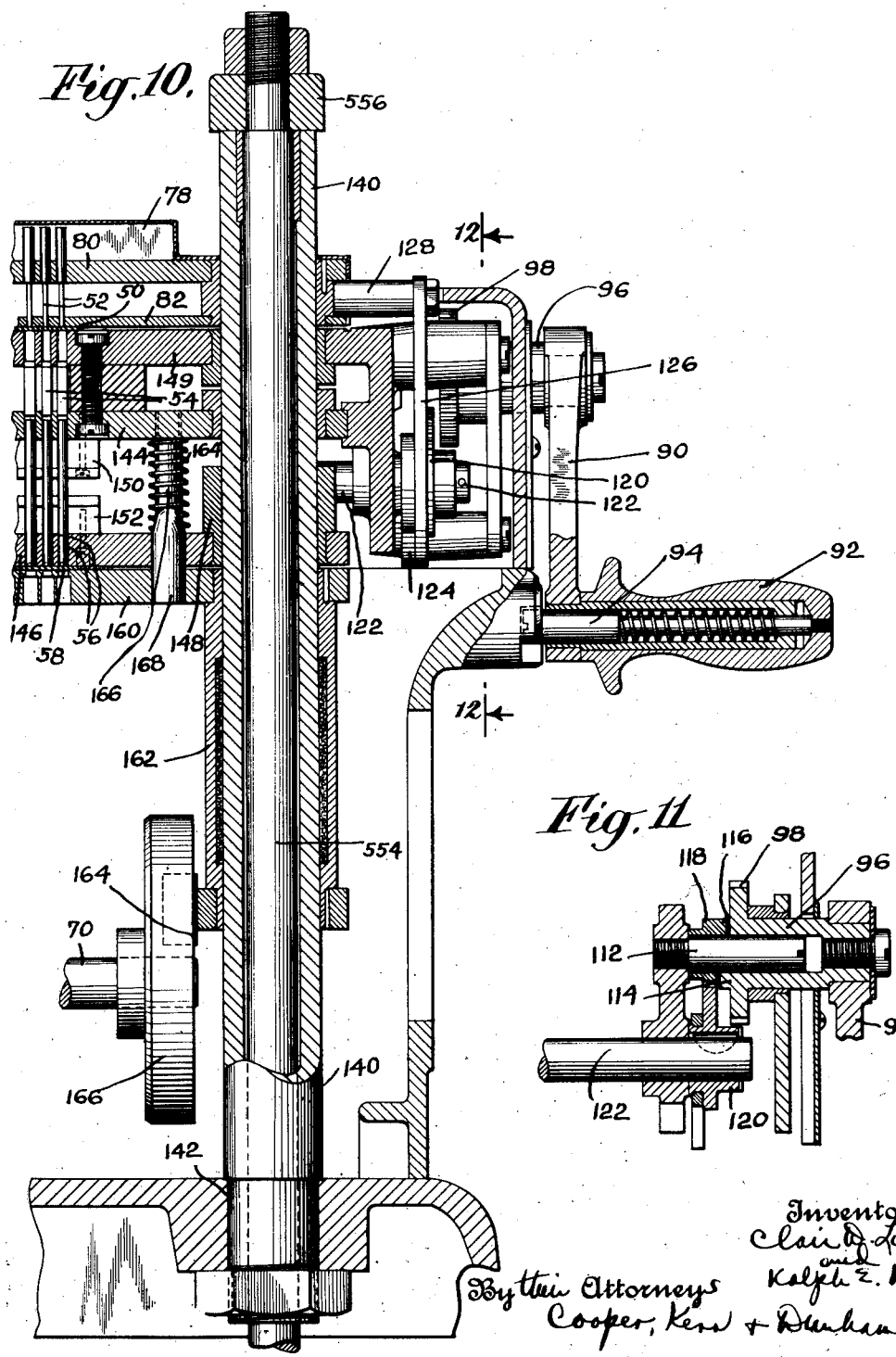

Aug. 4, 1931.   C. D. LAKE ET AL   1,817,631
DUPLICATING GANG PUNCH
Filed Oct. 21, 1925   15 Sheets-Sheet 9

Inventors
Clair D. Lake
Ralph E. Page
By their Attorneys
Cooper, Kerr & Dunham

Aug. 4, 1931.  C. D. LAKE ET AL  1,817,631
DUPLICATING GANG PUNCH
Filed Oct. 21, 1925   15 Sheets-Sheet 10
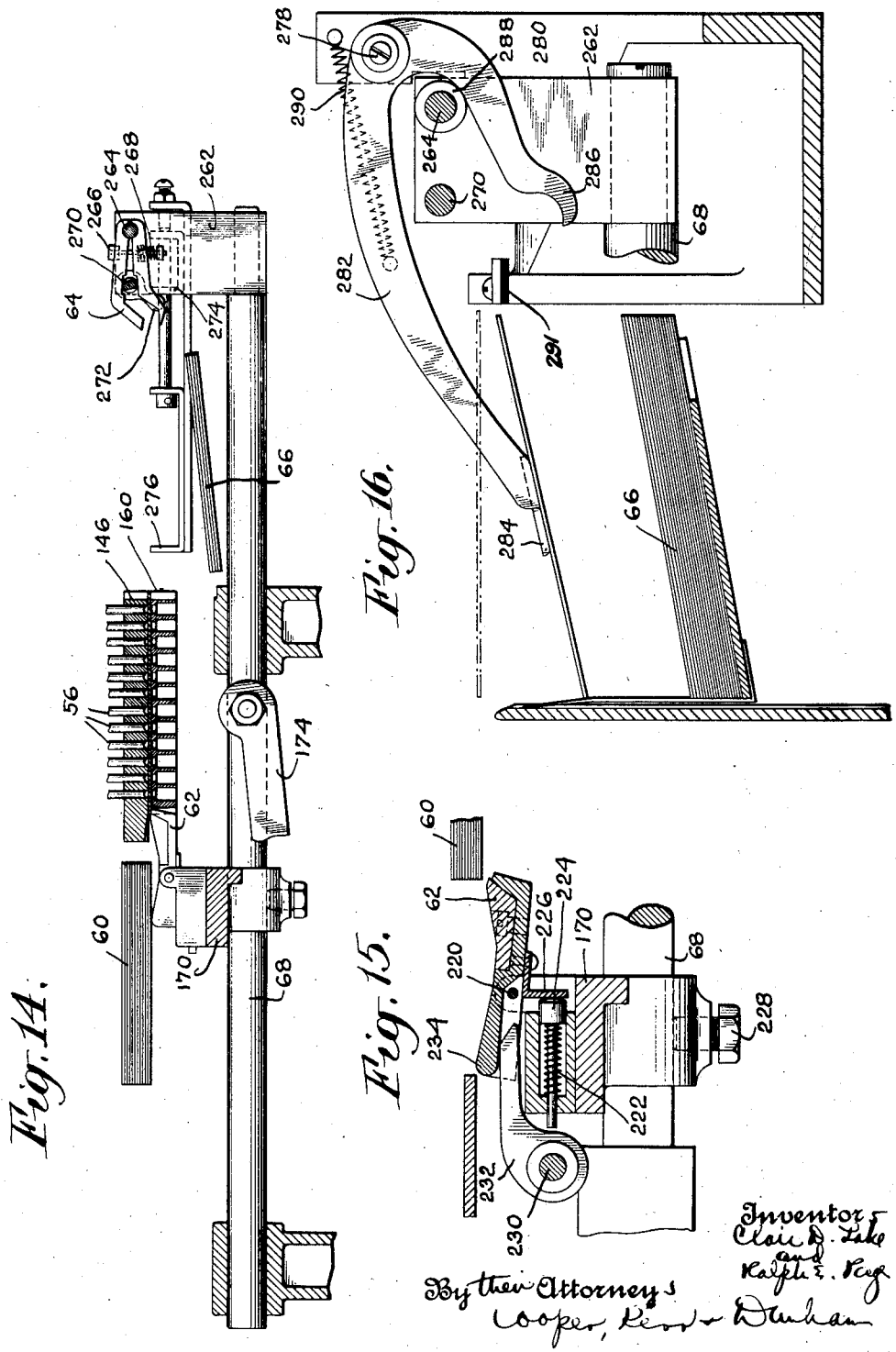

Aug. 4, 1931.   C. D. LAKE ET AL   1,817,631
DUPLICATING GANG PUNCH
Filed Oct. 21, 1925   15 Sheets-Sheet 11
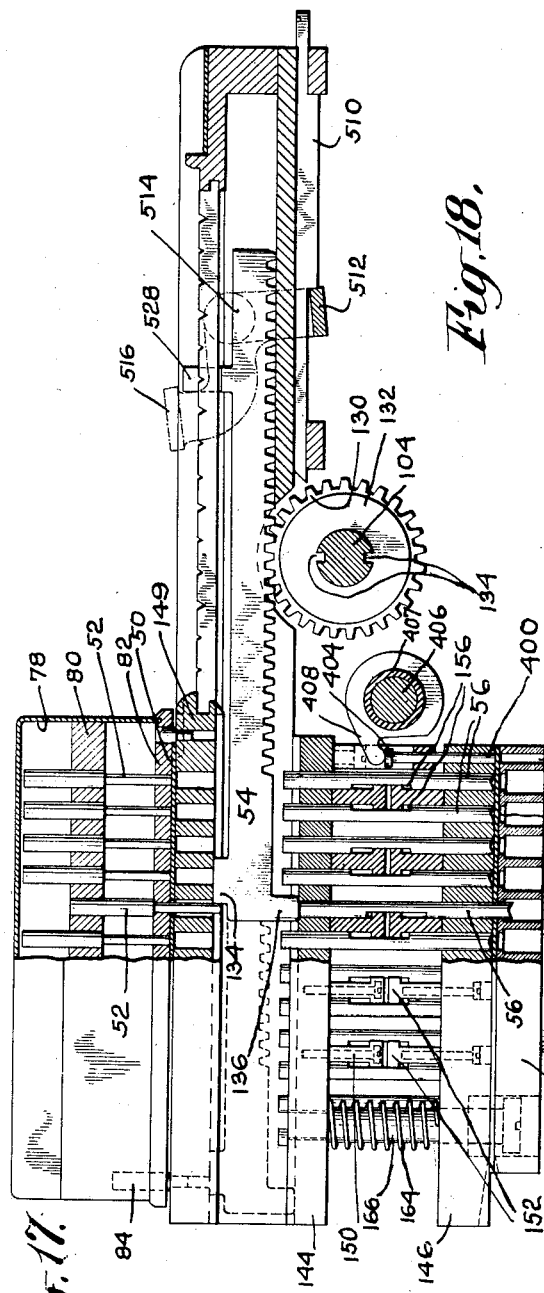
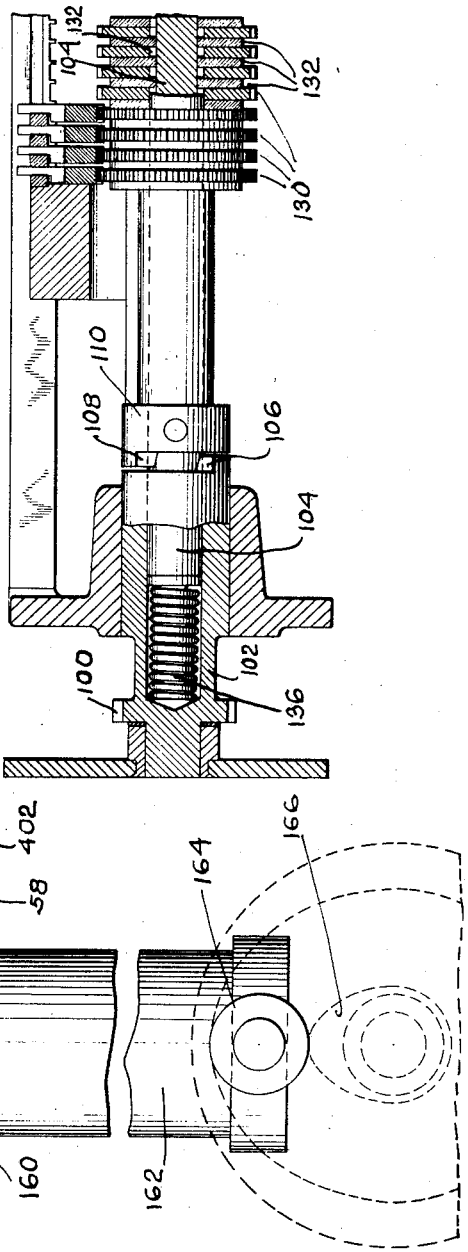

Aug. 4, 1931.  C. D. LAKE ET AL  1,817,631
DUPLICATING GANG PUNCH
Filed Oct. 21, 1925   15 Sheets-Sheet 12
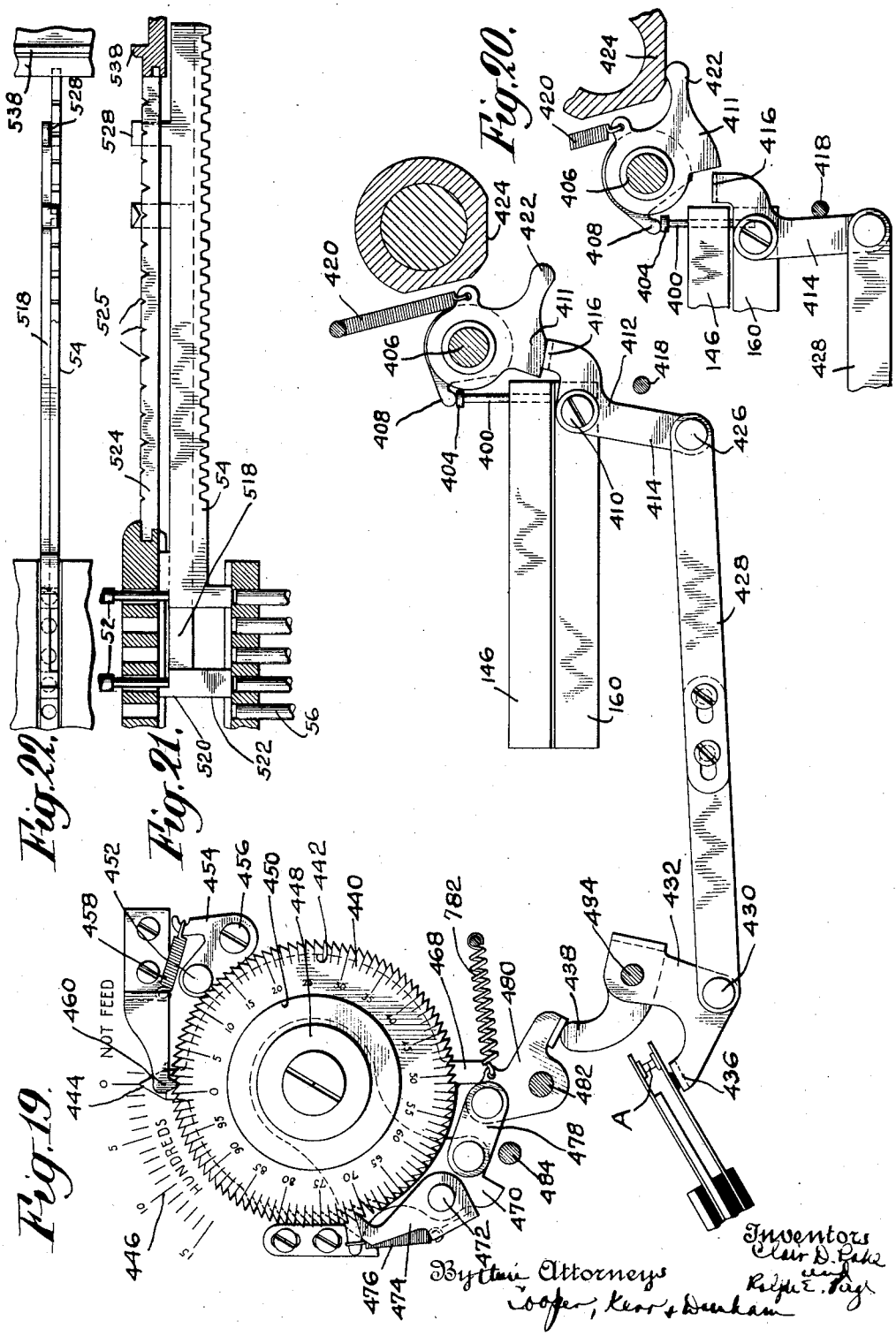

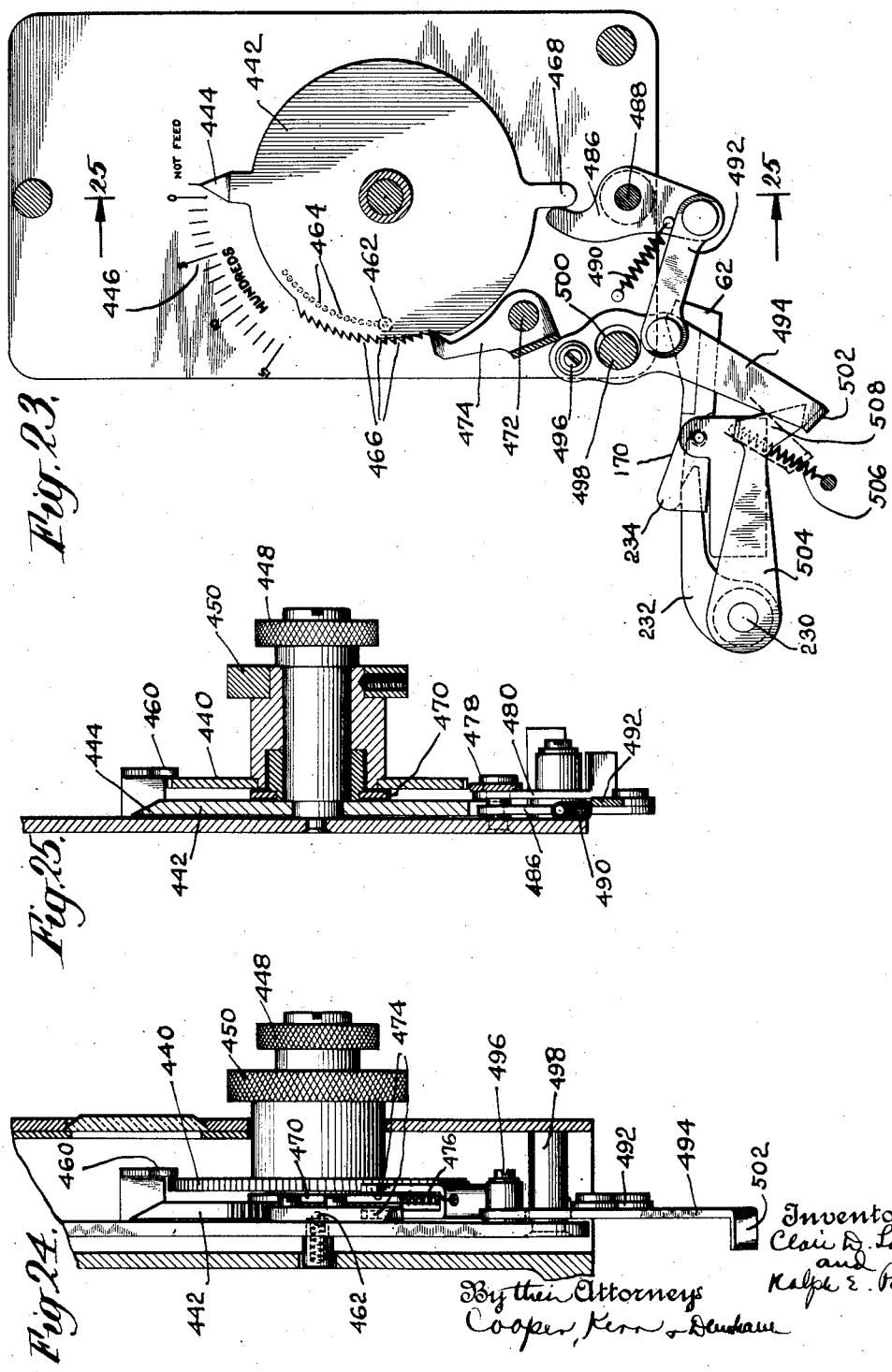

Aug. 4, 1931.  C. D. LAKE ET AL  1,817,631
DUPLICATING GANG PUNCH
Filed Oct. 21, 1925  15 Sheets-Sheet 14
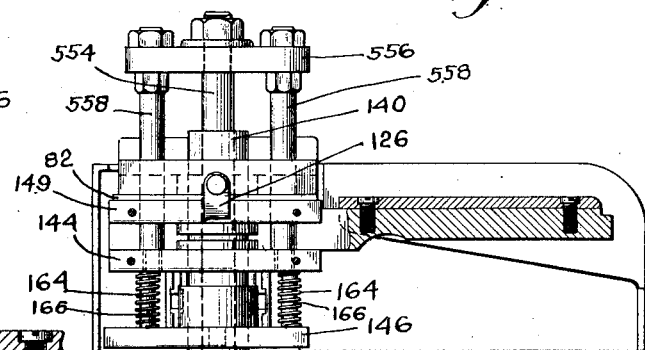
Fig. 27.  Fig. 26.
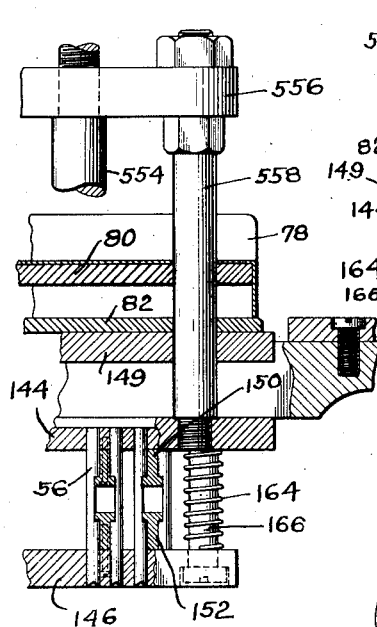
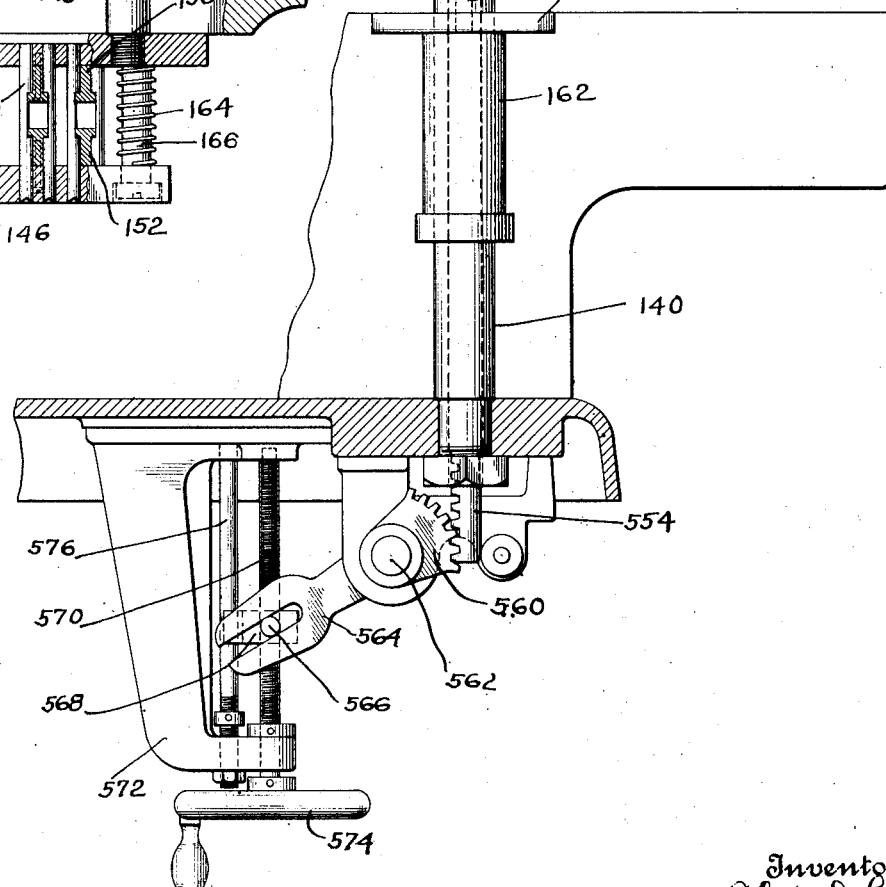

Aug. 4, 1931.                C. D. LAKE ET AL                 1,817,631
                          DUPLICATING GANG PUNCH
                          Filed Oct. 21, 1925        15 Sheets-Sheet 15
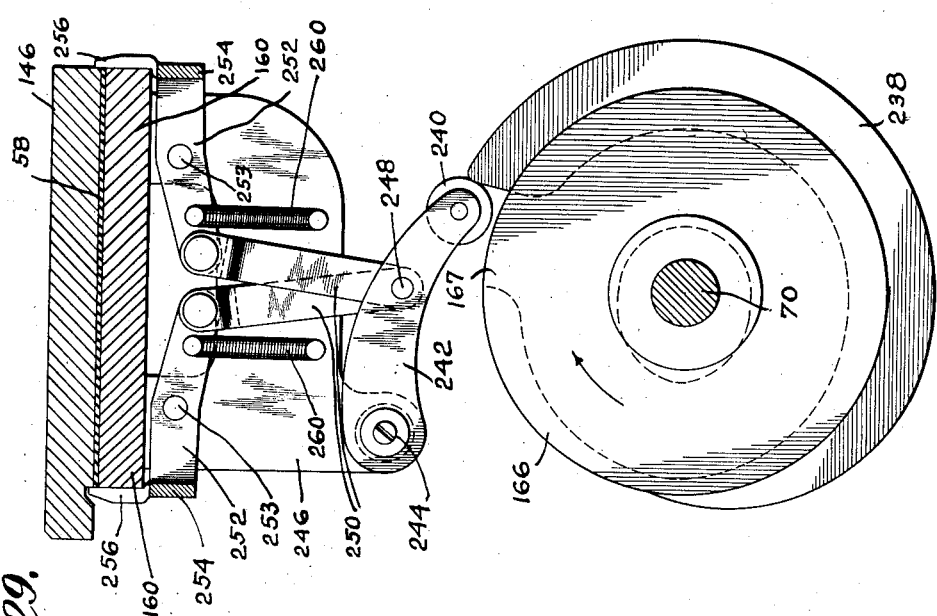
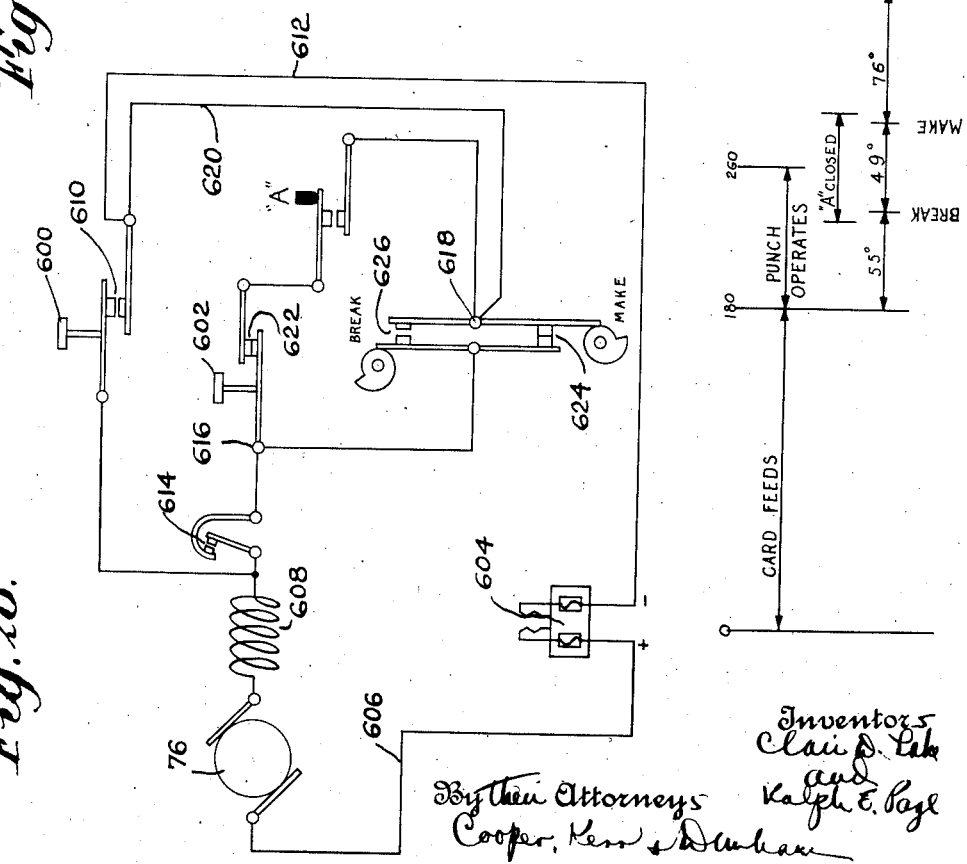

Patented Aug. 4, 1931

1,817,631

UNITED STATES PATENT OFFICE

CLAIR D. LAKE AND RALPH E. PAGE, OF BINGHAMTON, NEW YORK, ASSIGNORS TO THE TABULATING MACHINE COMPANY, OF ENDICOTT, NEW YORK, A CORPORATION OF NEW JERSEY

DUPLICATING GANG PUNCH

Application filed October 21, 1925. Serial No. 63,830.

This invention pertains to machines for performing gang punching operations on perforated record cards such as are used in tabulating machines. For some purposes, in connection with tabulating machine accounting, it is necessary to have a number of duplicate cards punched exactly alike.

This is accomplished by first punching a single card by the usual key operated hand punch, and then placing that card in a machine of the type disclosed in the present invention which will duplicate the pattern card in any desired quantity, punching the cards one at a time until the predetermined number has been punched. All holes are punched in each card at a single operation by a plurality of punches.

The general object of the present invention is to provide such a gang punch of simple and substantial design, economical to manufacture, and satisfactory in the hands of the operator, and is more particularly directed to improvements in the gang punch disclosed in copending application of John T. Schaaff, Serial No. 732,933 now patent No. 1,763,067, dated June 10, 1930.

One particular object is to provide means permitting the operator to readily separate the die plates in order to remove a damaged or imperfect card should one become lodged in the machine.

Another object is to provide improved devices for removing the punched cards and stacking them in the delivery magazine.

Another particular object is to provide improved and simplified mechanism for feeding cards from the supply stack to the punching device.

Another object is the provision of suitable safety devices for preventing damage, should anything interfere with the normal operation of the machine.

Another object is the provision of a simplified device which may be preset to stop the machine when a predetermined number of cards have been punched.

Another object is to provide improved means for accurately locating the card in the punching device.

Further and other objects and advantages will be hereinafter set forth in the accompanying specifications and claims and shown in the drawings, which by way of illustration show what is now considered to be the preferred embodiment of the invention.

In the drawings:

Fig. 4 is a sectional elevation on line 4—4 of Fig. 2.

Fig. 5 is a sectional elevation on line 5—5 of Fig. 4.

Fig. 6 is a sectional plan on line 6—6 of Fig. 4.

Fig. 7 is a sectional elevation on line 7—7 of Fig. 4.

Figs. 8 and 9 show enlarged details of the picker actuating mechanism.

Fig. 10 is a sectional elevation of a portion of the machine, following generally the line 10—10 in Fig. 1.

Fig. 11 is a detail section on line 11—11 of Fig. 12.

Fig. 14 shows details of the card feeding and removing devices.

Fig. 15 shows details of the card picker and a portion of the device which renders the picker inoperative.

Fig. 16 shows details of the card stacker.

Fig. 17 shows details of selector pins and punch devices, with an interposer bar in advanced position.

Fig. 18 is a detail of gear mechanism for moving interposer bars.

Fig. 19 shows details of mechanism for operating the devices which stop the machine when a predetermined number of cards have been punched.

Fig. 20 shows details of device for stopping the machine in the absence of a card between the dies.

Figs. 21 and 22 show a special form of interposer bar including an auxiliary bar.

Figs. 23, 24 and 25 show details of the device for rendering the card picker inoperative when the predetermined number of cards has been fed.

Fig. 26 shows the mechanism for separating the die plates.

Fig. 27 is a detail of Fig. 26.

Fig. 28 is a circuit diagram of the machine.

Fig. 29 shows the devices for locating the card about to be punched.

Figure 1:
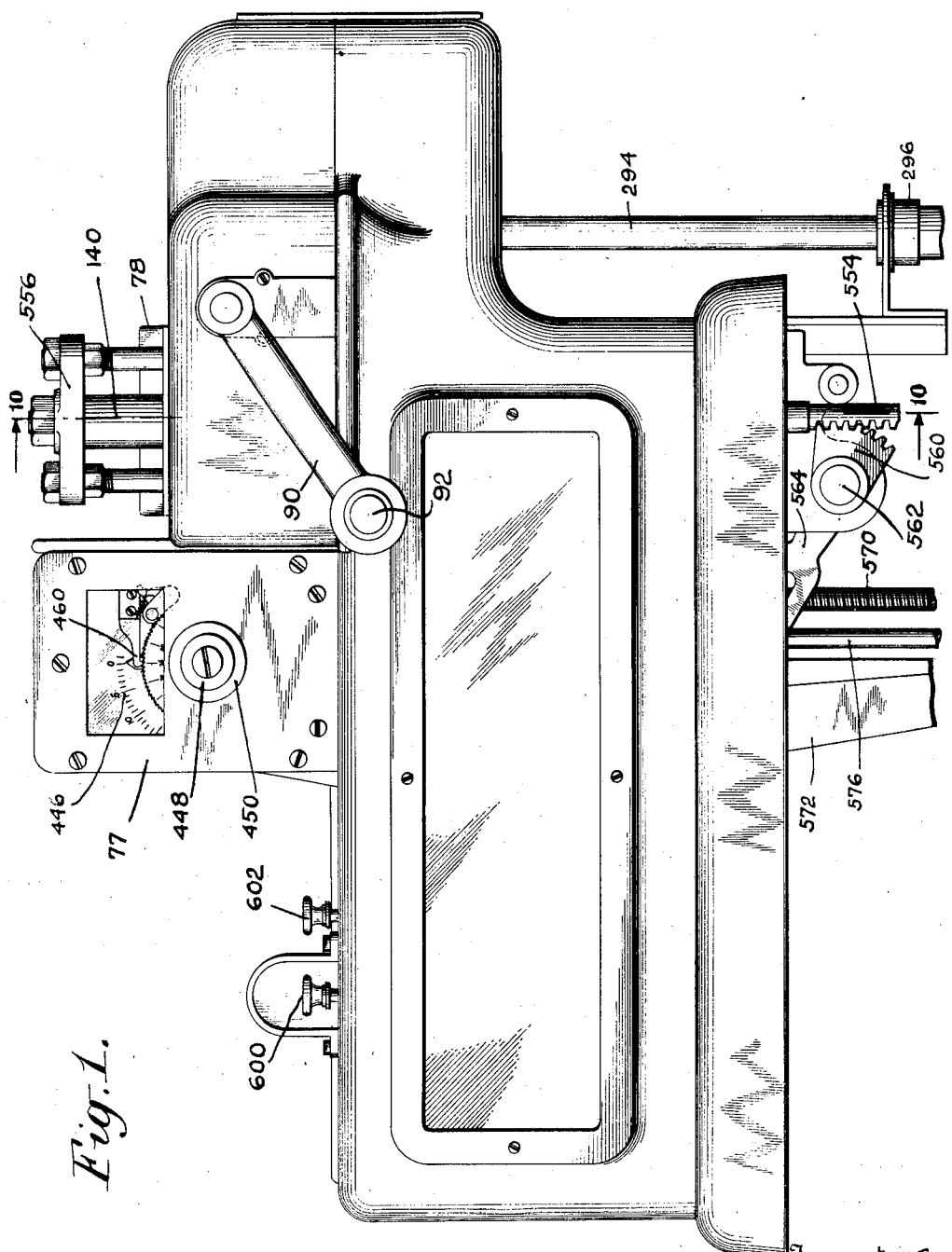
Fig. 1 is a front elevation of the machine.

A general understanding of the machine and its operation may be obtained from Fig. 4. The pattern card 50 is placed in position underneath pattern pins 52. All pins that register with holes in the pattern card drop through the perforations and cooperate with interposer bars 54 to render effective the proper punches 56 to perforate the blank card 58 then between the die plates.

The blank cards are fed one by one from magazine 60 by picker 62 to a position under the punches and, after punching, the card is removed by nippers 64 and deposited on the discharge stack 66.

The picker is reciprocated by rods 68 actuated from shaft 70 by connecting rod 72 and arm 74. Power for the whole machine is supplied by motor 76, which drives shaft 70 through shaft 71 and worm gears contained within gear box 73. When the predetermined number of cards have been punched, the machine is stopped by the control device designated generally as 77 in Fig. 1.

We will now describe in detail the construction and operation of the various component parts of the machine.

There is one pattern pin 52 for each index position in the card, so when the pattern card 50 is in position, one pin 52 rests on, or passes through, each index position. The pattern pins are contained in the pin box 78 (Figs. 12 and 17) and are supported by upper and lower plates 80 and 82 respectively, in which plates the pins move freely vertically.

Figure 2:
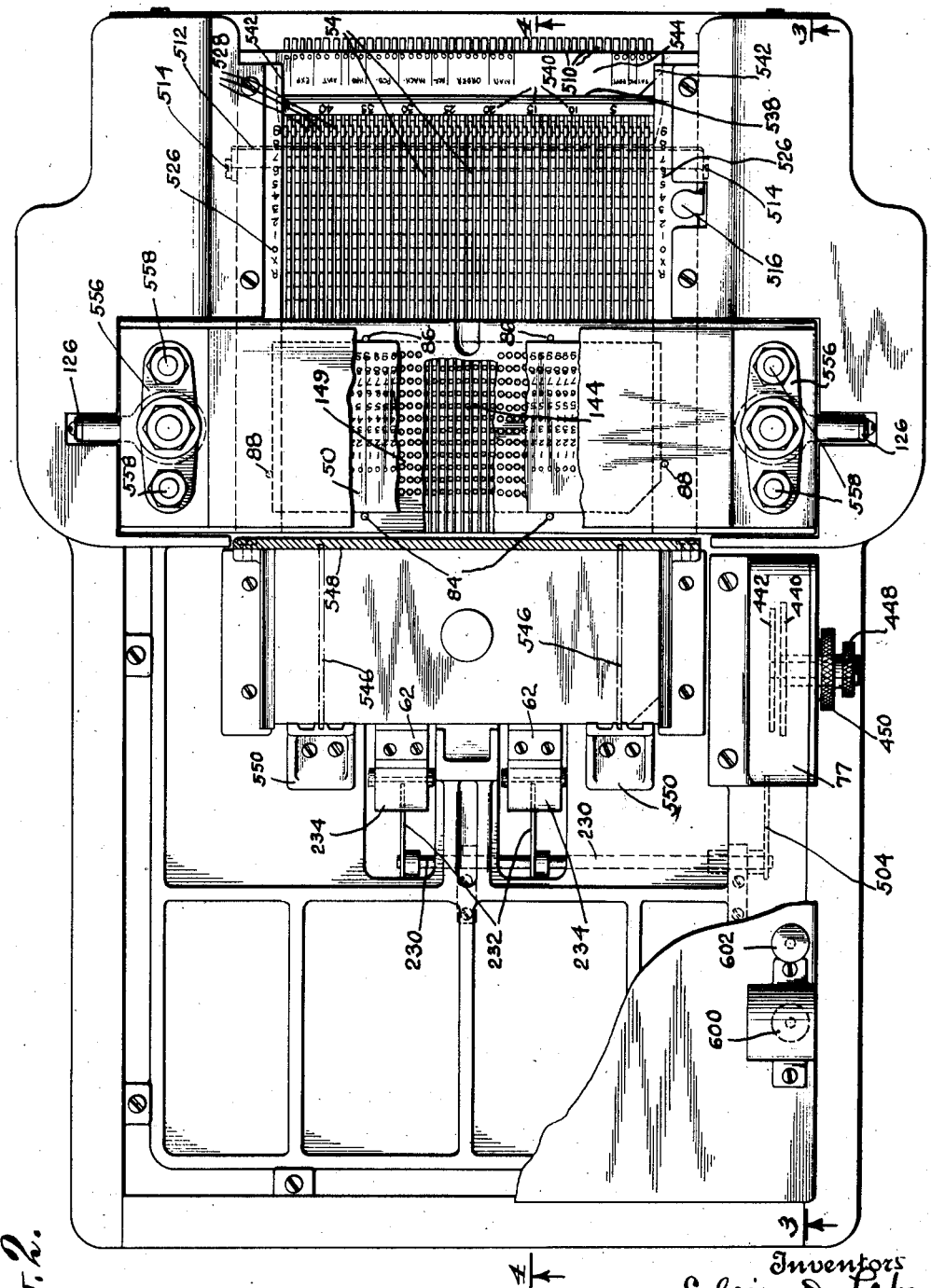
Fig. 2 is a plan view of the machine with parts broken away to show the picker devices, and certain features of the punching mechanism.

The pattern card is exactly located by fixed pins 84 and 86, two on each side and a single pin 88 at each end of the card (Fig. 2).

All pins 52 that find perforations in the pattern card drop through the holes until their enlarged upper portions rest on lower plate 82, in which position the lower ends of the pins are in position to cooperate with the interposer bars 54 as will be later explained.

To place the pattern card in position, hand crank 90 is moved counterclockwise one revolution by means of handle 92 which is normally locked in the position shown in Fig. 1 by means of spring pressed plunger 94 contained within the handle.

Figure 12:
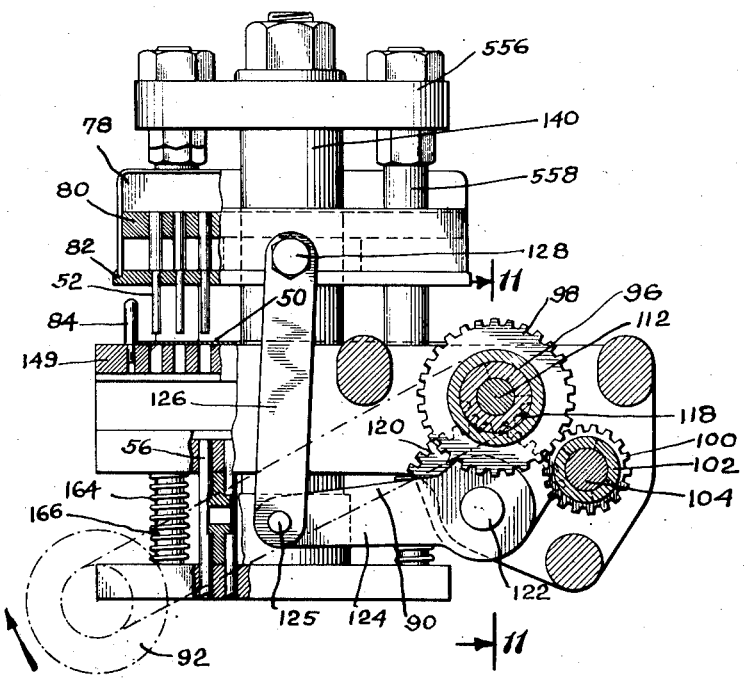
Fig. 12 is a section on line 12—12 of Fig. 10.

During the first half of the movement of crank 90 all interposer bars 54 are retracted to their home positions, and during the second half of the crank movement the pin box and pattern pins are raised to the position shown in Fig. 12 so the pattern card may be inserted from the right. This movement of pin box and interposers is brought about as follows: Crank 90 is fast on sleeve 96, as is also gear 98 (Figs. 10, 11 and 12). In mesh with gear 98 is pinion 100 integral with sleeve 102 which is mounted on interposer shaft 104. The inner end of sleeve 102 is provided with a clutch jaw 106 (Fig. 18) which engages a cooperating lug 108 on collar 110, fast on shaft 104.

Sleeve 96 which carries gear 98 is supported for rotation on stud 112, fast to the frame of the machine. The inner end of sleeve 96 is provided with a projection 114 (Fig. 11), which cooperates with a lug 116 on pinion 118, free to turn on stud 112. Pinion 118 has teeth cut in only part of its circumference, and these teeth are in mesh with the teeth of segmental gear 120, fast on shaft 122, which also has keyed to it crank arms 124, one at each side of the machine. Each arm 124 carries pivotally a vertical link 126, the upper end of which is pivotally connected to pin box 78 by studs 128 (Fig. 10).

Fig. 12 shows the pin box and pattern pins in raised position with crank 90 locked after the completion of its counterclockwise revolution referred to above, during which the interposer bars were first retracted and then the pin box raised. During the first portion of the reverse or clockwise revolution of crank 90, while it is being restored to normal working position, projection 116 on pinion 118 engages lug 114 on gear 98 and the pin box is lowered onto the card 50. Thereupon lug 114 leaves the projection 116 and gear 98 continues its rotation without further movement of pinion 118, gear 120 or arm 124. At this point in the revolution, projection 106 contacts with lug 108, and interposer shaft 104 rotates, carrying the interposer bars into contact with those pins which passed through the pattern card. At the completion of the clockwise revolution of the hand crank it is locked in position by pin 94 and the machine is ready to operate. During a counterclockwise turn of handle 90, the other faces of lugs 114, 116 and 106, 108 come into contact at such points in the revolution that bars 54 are first retracted and afterwards the pin box is raised, as before described.

The method of actuating interposer bars 54 may be understood from Figs. 17 and 18. Each bar 54 has rack teeth cut on its under-side, and each rack is in mesh with a gear 130, free to turn on shaft 104. Gears 130 are mounted on shaft 104 with friction discs 132 between the gears. The shaft is splined as at 134, and each friction disc has projections fitting into the splines, so the discs must turn with the shaft. Coil Spring 136 contained within sleeve 102 serves to press the assembly of gears 130 and discs 132 together so when shaft 104 rotates, gears 130 are driven by friction with discs 132. If any gear meets sufficient resistance to overcome friction with the discs it will stop, while the discs in contact with it will continue to turn with the shaft. Thus, when the interposer bars 54 are moved to the left by gears 130 during the second half clockwise revolution of hand crank 90 after the pin box has been lowered, any bar 54 which encounters a pattern pin as in Fig. 17, will be arrested, while all those which do not encounter pins will pass on to the dotted position where they are ineffective. Any bar stopped by a pattern pin has its upwardly projecting shoulder 134 against the pin, while its downward projection 136 is directly over the punch 56 corresponding to the pattern pin above it. As indicated in Fig. 2 there is an interposer bar for each index column on the card. Pin box 78 is guided in its vertical movement by hollow columns 140, rigidly supported on the frame of the machine at 142.

The punches 56 are guided at their upper ends by plate 144, and at their lower ends by plate 146 (Fig. 10). Upper plate 144 is fixed in position and is grooved on its upper side to guide the interposer bars 54. Lower plate 146 is movable vertically, being guided by bushings 148 on columns 140. Grooved plate 149, fast to plate 144, serves as the upper guide for the interposer bars.

Fast to upper guide plate 144 is a series of downwardly projecting T-bars 150, and fast to lower guide plate 146 is a corresponding series of upwardly projecting T-bars 152. Each punch 56 is notched on its side as at 156 (Fig. 17), and the above mentioned T-bars are so located between the punches that every punch 56 engages, by means of its notch 156, both an upper and a lower T-bar, as is best shown in Fig. 17.

Die plate 160 is supported and guided for vertical movement by sleeves 162 fitted to columns 140. On the lower end of sleeves 162 are fitted cam followers 164 rolling in box cams 166, mounted on shaft 70 and so timed as to give sleeves 162 and die plate 160 one up and down reciprocation every card cycle.

At the bottom of the stroke of the die plate it is separated from guide plate 146 sufficiently to allow the card 58 to be readily slipped between them. At this time plate 146 is resting on guide plates 236 (Fig. 6) which limit the downward travel of the plate.

Plate 146 is spring pressed downwards by four helical springs 164, guided by the stems of studs 166 fast in upper plate 144, the round heads of the studs being in clearance holes drilled in die plate 160. The bolt holes in plate 146 are counter-bored to provide clearance for the bolt heads for a purpose to be later explained. Die plate 160 is guided relatively to plate 146 by dowel pins 168 fast in 160 and sliding snugly in holes drilled in 146.

After the blank card 58 is in position on die plate 160, cam 166 forces die plate 160, lower guide plate 146, and the card, upwardly, with the result shown in Fig. 17. The punch directly underneath projection 136 of interposer box 54 is prevented from moving upwardly and is forced through the card, making a perforation corresponding in location to the hole directly above it in the pattern card. All unrestrained punches are borne freely upwardly by card 58 and punch no holes. As cams 166 continue their rotation, all punches and parts previously forced upwards are restored to their home position, being forced downwardly by their own weight, by springs 164, and by the outer face of box cam 166 acting on roller 164. During this downward motion all punches are restored to their home positions by T-bars 150 and 152. Box cam 166 is provided with an opening 167 in its outer rim for assembly purposes only.

As there is an interposer bar 54 for every column on the card and a pattern pin 52 with its corresponding punch 56 for every index position in each column, it is evident that the above described operation punches card 58 as an exact duplicate of pattern card 50, provided there is only one perforation in each card column, as is usually the case. If there are two perforations in some columns, special equipment is provided as will be later described.

The card feeding apparatus may be understood by reference to Figs. 4, 14 and 15.

The blank cards are placed in magazine 60 and are fed one by one from the bottom of the stack by a pair of pickers 62 which are pivotally mounted on bar 170 extending crosswise of the machine and fast at its ends to bars 68 (Figs. 6 and 7).

Pivotally attached to each bar 68 at 172 is a link 174. Fast to hubs 209 which are pinned on shaft 176 near its ends are a pair of substantially vertical arms 178. The upper ends of these arms are rigidly connected together by flat plate 180, and they are also pivotally connected at 182 with links 174. Shaft 176 is supported in bearings 184 fast to the frame of the machine.

Mounted near the middle of the shaft 176 and free to rock thereon is a hub 186 with upwardly extending arms 188 fast to it. Fitted in vertical jaws 190 in the upper ends of arms 188 is a horizontal pin 192. Fitted to the side of each arm 188 is a flat plate 194 (Fig. 9) having a hole at its upper end fitting over pin 192, having a jaw 196 at its lower end fitting over shaft 176, and having a slot 198 through which a screw 200 secures plate 194 to arm 188. It is evident that the distance between pin 192 and shaft 176 may be varied by this construction.

Immediately to the right of the above assembly (Fig. 7) is a flat arm 202, its lower end pivoted on shaft 176 and its upper end held in contact with one side of plate 180 by spring 204 (Figs. 4 and 8) extending to plate 206 which has a hub 208 free on shaft 176, and an upwardly extending portion which in normal position is in contact with the other edge of plate 180 (Fig. 4).

Carried on the projecting end of pin 192 is a roller 210, which under normal condition is held snugly between arms 202 and 206 as in Fig. 4. Mounted on crank pin 192 is a bearing 212, forming one end of connecting rod 72, the other end of which has a bearing 214 fitted to crank 216 which forms part of shaft 70.

As shaft 70 revolves, crank 216 through connecting rod 72, and crank pin 192, rocks arms 202 and 206 back and forth, and through links 74 reciprocates rods 68 and pickers 62. The length of connecting rod 72 may be adjusted by turnbuckle 218. Rods 68 are supported for reciprocation by rigid brackets fast to the frame of the machine.

The tension of spring 204 is such that the two jack knife arms 202 and 206 will remain in contact with plate 180 and roller 212 during the normal operation of the machine, but should picker 62 meet unusual resistance, as from a torn or lodged card, arm 206 will be moved idly back and forth by roller 212 until the machine stops or the obstruction is removed so that spring 204 will again be able to draw arm 202 and the picker mechanism forward.

Pickers 62 are pivoted at 220 on bar 170, and are pressed upwardly against the cards by coil spring 222 acting through plunger 224 on the angle piece 226 on the under side of picker 62 (Fig. 15). Cross bars 170, with the pickers, are held to bars 68 by set screws 228 and may be adjusted on bars 68 at will.

Under certain conditions it is desired to automatically stop feeding cards. This is accomplished by rocking shaft 230 slightly counterclockwise, thus causing the fingers 232, mounted on shaft 230, to raise the rear end 234 of the picker as shown in Fig. 15, in which position the picker 62 will miss the cards entirely when reciprocated. How this is done will be later explained.

The picker mechanism just described carries the card forward to approximately its proper position on the die plate. The card is in proper position endwise, because guided by the guide plates 236 (Fig. 6), but owing to changeable momentum of cards due to various conditions, even though the effect of such changes is minimized by friction springs 237 bearing on the top of the card being fed, it is necessary to provide additional devices to exactly locate the card sidewise under the punches. This mechanism is shown in detail in Fig. 29. The right hand cam 166 (Fig. 5) has on its outer periphery a cam 238, on which rides a cam follower 240 carried on the outer end of arm 242 pivoted at 244 to plate 246 which is fastened to the under side of die plate 160. Extending upwardly from a pivotal connection 248 on arm 242 is a pair of links 250, each connected pivotally at its upper end to the free end of a horizontal lever 252, pivoted at 253. On their outer ends these levers carry bars 254 extending the greater part of the length of die plate 160, as shown in Fig. 5. Bars 254 are each provided with two upwardly projecting fingers 256. At the left side of the machine, pivotal supports corresponding to 253 are provided in an angle piece 258 fast to die plate 160.

While a card is being pushed into place on the die plate by picker 62, roller 240 is on the high part of cam 238, and fingers 256 are in position shown in Fig. 4, but as soon as the picker has withdrawn and before cams 166 have raised the die plate, roller 240 drops off cam 238 (Fig. 29) aided by springs 260, whereupon fingers 256 snap into the position shown in Fig. 29, thereby forcing the card 58 to register exactly with die plate 160.

After the card has been punched and while still on the die plate, the forward edge of the card is gripped by the nippers 64, which are mounted on brackets 262, fast to the right ends of rods 68 as shown in Fig. 14. The gripper mechanism is reciprocated with the picker, so that when the pickers begin to feed a new card from the stack the nippers are beginning to withdraw the punched card from the dies, and as the new card takes its place under the punches the punched card is deposited on the discharge stack.

The nippers comprise upper and lower jaws, pivoted at their dead ends on crossshaft 264 and drawn together by bolt 266 and spring 268. Near their live ends a flattened portion of shaft 270 passes between the jaws. When the flat part of the shaft is horizontal the jaws are drawn to gripping position by spring 268, as in Fig. 4, and when the flats are not horizontal the jaws are forced apart as in Fig. 14.

Fast on both ends of shaft 270 are triggers 272 (Fig. 6) which contact with adjustable stops 274 as rods 68 reach the outer end of their stroke. The contact of the triggers against the stops rotates shaft 270 so the flat portions thereof force the nipper jaws apart, as in Fig. 14, and the card is released. At the end of the back stroke of rods 68 one of the triggers 272 contacts with the adjustable stop 276 (Figs. 6 and 14), whereupon shaft 270 is snapped into position with its flat portions horizontal and the nipper jaws 64 grip the card as in Fig. 4.

Crosswise of the machine at the extreme end, underneath the interposer bars is a cross-shaft 278 mounted in bearings 280 on the machine frame (Figs. 4, 6, 16). Fast on the ends of shaft 278 are arms 282 equipped with pads 284 on their free ends. Arms 282 extend horizontally and are of such length that pads 284 are above the ends of the cards in the discharge magazine as shown in Fig. 4. Arms 282 are equipped with downwardly extending cam arms 286 so shaped that their upper edges are engaged by rollers 288 on nipper shaft 264 when that shaft is nearing the end of its stroke to the right, whereupon arm 286, and with it arm 282, are depressed, pads 284 contact with the top of the card being released by the nippers and that card is forced downwardly into the discharge stack 66, as shown in Fig. 16. When rollers 288 move to the left on their return stroke, arms 282 and 286 are raised again by springs 290 to normal position with 286 against pad 291.

Discharge stack 66 is supported on a coil spring 292 contained within a tube 294 that telescopes into a lower tube 296 fast to the machine frame. Spring 292 depresses as its load of cards increases and maintains the top of stack 66 always at approximately the same level, which is at such height as to give cards no opportunity to turn over or become otherwise deranged after being released from nippers 64.

As shown in Fig. 17, lower guide plate 146 of the punching device is provided near its forward edge, with a vertical feeler pin 400, the lower end of which drops through into the clearance hole 402 in die plate 160 if no card be present. In the absence of a card the downward movement of the pin is limited by its head 404 resting on the machine frame.

However, if a card be present, pin 400 rests on the blank margin of the card and the pin is held in an elevated position as shown in Fig. 19.

Shaft 406 crosses the machine adjacent and parallel to the front edges of die plates 146 and 160, and carries a sleeve 407. On sleeve 407, midway of the length of shaft 406, is fastened an arm 408, the free end of which rests on the head 404 of pin 400. The near end of sleeve 407 has, fast to it, a cam shaped member 411. Pivoted on die plate 160 at 410 is a bell crank lever 412 having a downwardly extending arm 414 and a horizontal projection 416.

Whenever, on its up stroke, die plate 160 carries a card, pin 400 will be raised, and arm 408 will rock shaft 406 so that cam 411 will be in the path of projection 416 with the result that arm 414 will be moved to the left as in Fig. 19.

If there be no card on the die plate when it rises, pin 400 will be in its low position, shaft 406 will not be rocked, cam 411 will not obstruct projection 416, and arm 414 will remain in its position to the right against stop pin 418, as in Fig. 20.

Arm 408 is maintained in contact with the head 404 of pin 400 by spring 420, one end of which is fast to cam 411 and the other end to the machine frame. The rocking motion of shaft 406 is limited by arm 422 which abuts against the machine frame at 424 whenever no card is on the die plate.

Pivotally attached to depending arm 414 at 426 is a horizontal link 428, the other end of which is pivotally attached at 430 to a member 432 which, in turn, is pivoted on the frame at 434. Member 432 has a projection 436 which serves to keep contact "A" closed whenever arm 414 and connected member 432 swing to the left, and permits "A" to open when 414 and 433 are swung to the right, as they will be if no card is on the die plate.

Member 432 also has a finger 438, which, being actuated with member 432, arm 414, and other connected parts every time a card is in the dies, is used to actuate the mechanism about to be described, which stops the machine when the predetermined number of cards have been punched.

Figure 3:
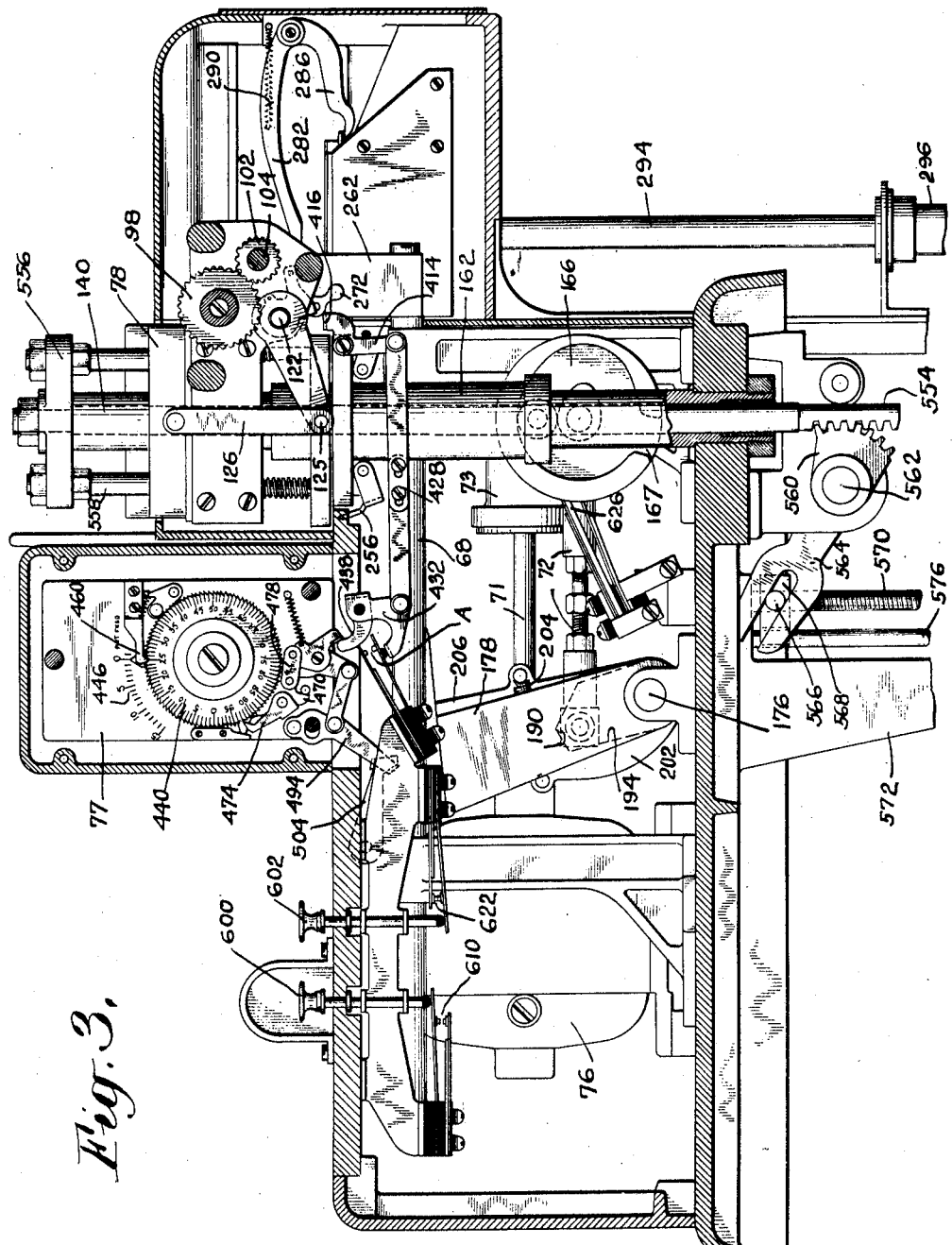
Fig. 3 is a sectional elevation on line 3—3 of Fig. 2.

This stop mechanism, designated generally as 77 in Figs. 1 and 3, is shown in detail in Figs. 19, 23, 24, and 25. It comprises a front dial 440 indicating units and graduated from 0 to 100, and a rear dial 442 having a pointer 444 coperating with a fixed chart 446 indicating hundreds and graduated 0 to 15, the capacity of the mechanism illustrated being 1500 cards. This may be increased or dimished as desired without change of the principle of operation of the device. The hundreds dial may be manually rotated by knob 448, and the units dial by knob 450. Units dial 440 is provided with one hundred evenly spaced notches in its periphery. A roller detent 452 cooperates with these notches, roller 452 being carried on bell crank lever 454 pivoted to the frame at 456, and held in contact by spring 458. Units wheel pointer 460 is fast to the machine frame. The hundreds dial has a ball detent 462 cooperating with a series of holes 464 drilled in the dial. Dial 442 is also supplied in its periphery with sixteen notches 466 spaced the same as the notches in the units dial. The hundreds dial also has a projection 468 from its lower edge.

Supported on the dial hubs is a plate 470 extending outwardly beyond the dials. Pivoted on plate 470 at 472 is a ratchet dog 474 held in contact with the notches in the units dial by spring 476 connected at one end to dog 474 and at the other end to a projection on plate 470. Plate 470 is connected by link 478 to lever 480 pivoted on the frame at 482 and contacting at its free end with arm 438. As previously described, arm 438 is rocked every time a card is punched. This rocking motion of arm 438 is transmitted through lever 480 and link 478 to plate 470 and dog 474 so that units dial 440 is rotated one notch for every rocking motion of arm 438, or in other words, for every card punched. Lever 480 is held in contact with 438 by spring 782, which serves also, through link 428, to move arm 414 into contact with stop 418 whenever die plate 160 is lowered. At the same time a shoulder on plate 470 stops against fixed pin 484. The hundreds dial 442 is slightly smaller in diameter than units dial 440 as may be seen in Fig. 19 in which dial 442 may be seen in dotted outline. It will be observed that the notch indicating 70 on the units dial is cut deeper than the other notches.

Dog 474 is so located that it drops into notch 70 when the 0 notch reaches indicator 460. Dog 474 is wide enough so that when it drops into the deep notch 70 it also drops into a notch in the hundreds wheel and moves both dials one notch. Below the hundreds dial (Fig. 23) is a vertical lever 486, pivoted on the frame at 488. The upper end of 486 is held in contact with the left side of projection 468 of the hundreds dial, by spring 490. Extending from the lower end of lever 486 is a link 492 which is connected at its other end to vertical arm 494 pivoted on the frame at 496, and limited in its travel by stud 498 fast in the frame and passing through the opening 500 in lever 494.

The lower end of lever 494 is bent over to form a lip 502 extending under the free end of arm 504 keyed to shaft 230 which carries fingers 232. Arm 504 is drawn downwardly by spring 506. Normally lip 502 is in dotted line position shown in Fig. 23, and arm 504 and attached fingers 232 are drawn down by spring 506 so that fingers 232 do not interfere with the normal card feeding operations of picker 62.

However, when dial 442 is moved to the position shown in Fig. 23, in which pointer 444 is to the right of the zero mark on chart 446, then tail 468 moves the upper end of lever 486 to the left which swings arm 494 to its full line position, camming under projection 508 of arm 504 and raising arm 504 and fingers 232, thereby rendering picker 62 ineffective by raising its near end 234 so that 62 passes freely underneath the cards.

With the above construction in mind, the operation of the automatic stopping mechanism will be readily understood.

If the number of duplicate punched cards desired is one hundred or less, dial 440 is set with the desired number opposite indicator 460. Say the desired number is 25. Then 0 on the dial will be 25 notches to the left of indicator 460, and the deep 70 notch will be 25 notches in counterclockwise direction from dog 474. Every time a card is punched, the dial will be moved by dog 474 one notch clockwise, so that when the twenty-fifth card is fed 0 on the dial reaches indicator 460 and dog 474 drops into the 70 notch at the same instant. When this occurs, the dog will also drop into the lowest (first) notch of the hundreds dial as shown in Fig. 23, and will move it clockwise to the "not feed" position so that tail 468 actuates lever 486 and renders the card picker ineffective, as already explained. No more cards being fed, feeler pin 400 will drop through die plate 160 and the machine will stop on account of the opening of contact A, as explained above.

If the number of duplicate cards desired is more than 100, pointer 444 is set to indicate the desired hundreds on chart 446 and dial 440 is set as before to indicate the odd number of cards. For example, if the desired number is 925, the units dial would be set as before, but pointer 444 of the hundreds dial would be set at the nine mark on chart 446. When the machine operates it will do exactly as above described, except that when dog 474 first drops into the deep 70 notch in the units dial it will not engage the first (bottom) notch on the hundreds dial, but instead, the tenth notch up. After another hundred cards has been fed it will engage the ninth notch, and so on until 925 cards have been fed, at which time it will engage the first (lowest) notch and move pointer 444 to the "not feed" position and stop, first the card feed, and then the motor, as described above.

It sometimes happens that a pattern card has some perforations that it is not desired to duplicate in the punched card. To meet such a condition we provide each interposer gear 130 with a locking bar 510 (Figs. 2 and 17). If any bar 510 be pushed in, its inner end will engage a tooth of its corresponding gear and prevent that gear rotating while shaft 104 is turning, and consequently no interposer bar will be moved into place for that card column and no hole will be punched in that column. Bail 512 pivoted at 514 and extending under all bars 510 is provided to retract all bars 510. The bail is actuated by depressing thumb piece 516.

It is sometimes desired to perforate more than one hole in a single card column. To meet such a condition any or all interposer bars may be made double, or provided with auxiliary bars as shown in Figs. 21 and 22, in which 54 is the regular bar with rack teeth and 518 is the auxiliary bar, slidable on bar 54 and both bars together being the same thickness as the regular bar.

In operation, the auxiliary bar is pushed through by hand past the punches and after the regular bar 54 has been positioned in the usual manner over one hole by the first pattern pin, then bar 518 is drawn back by hand to a position against the other pattern pin in the same column, in which position its shoulder 520 will be against the pattern pin 52 and its downward projection 522 above the corresponding punch 56, and two holes will be punched in that column.

Each interposer bar slides between a pair of fixed guides 524 provided on their top surface with notches 525 corresponding to the index position marked on the frame of the machine at 526 in Fig. 2. Notches 525 help the operator to visually check the position of interposer bars. Each bar 54 is provided near its exposed end with an upward extension 528 which serves as a finger piece by which the bars may be individually moved manually (Figs. 2 and 17).

Figure 13:
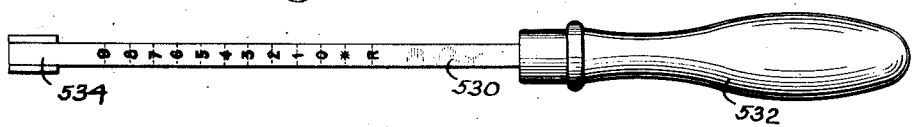
Fig. 13 shows the device for hand setting of interposer bars.
Figure 13A:
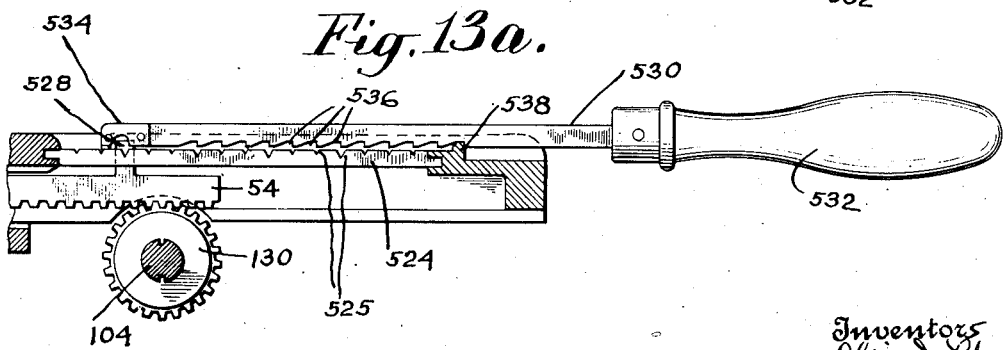
Fig. 13a is a detail section illustrating the use of the device shown in Fig. 13.

It is sometimes desirable to set punches without the use of a pattern card. This is done most conveniently by means of the devices shown in Figs. 13 and 13a. 530 is a tool provided at one end with a convenient handle 532, and at the other end with a socket 534 designed to fit over a projection 528 on any interposer bar. The top surface of 530 is provided with a series of designations corresponding to the index positions in a card column, and the under surface of the tool is notched as at 536 corresponding to those designations. Notches 536 are so spaced and located that if socket 534 be set over any projection 528 on an interposer bar, and that bar pushed in until a notch 536 is lodged over and against the bar 538 on the edge of the machine frame, then the operator knows that projection 136 on the inner end of the interposer bar is over the proper punch and that the index position corresponding to the designation on hand tool 530 will be punched in that column of the card.

Most tabulating cards have their columns numbered from 1 to 45, and for the convenience of the operator we provide a numbered scale at 540 adjacent the interposer bar (Fig. 2) in order that he may more easily select, or check, the setting of the interposer bars.

As a further convenience for the operator we also provide slides 542 in which he may place the headings cut from a card, similar to those being punched, as at 544, which enables the operator to more readily locate the columns.

Sometimes cards shorter than regular are to be punched, so we provide our card magazine with removable end partitions 546 (Figs. 2 and 7), which may be set in slots in front wall 548 and in corresponding rear brackets 550 in order to provide a magazine of suitable length. The guide pins and plates in the punching mechanism are also changed to suitable positions.

The waste material punched from the cards falls through the die plate and is carried by conduit 552 to a suitable receptacle (Fig. 4).

It sometimes happens, in the regular operation of the machine, that a card becomes jammed or lodged in the punching apparatus, and it is necessary to provide means to give the operator convenient access to the damaged card in order to remove it quickly.

To accomplish this result, we have designed our machine so all that portion of the mechanism above the die plate may readily be raised sufficiently to give ready access to the card, and may then be readily and quickly restored to working position.

Within the hollow columns 140, and extending above and below the columns, are rods 554. These rods are slidable vertically within the columns. Secured to the top of each rod 554 is a rigid cross-piece 556. Fast to each end of each member 556 and depending therefrom are the rods 558 which pass down through pattern pin box 78, plates 80, 82, and 149, and are secured to upper punch guide plate 144 (Figs. 10, 12, 26, 27).

Cut on the lower ends of rods 554 are rack teeth meshing with segmental gear 560 pivoted to the frame at 562, and having a rearwardly projecting arm 564 which has a slotted end engaging a pin 566 projecting from nut 568 mounted on vertical screw 570 (Fig. 26). This screw is supported at top and bottom for rotation in bracket 572 fast to the machine frame.

The extreme lower end of screw 570 is provided with a hand wheel 574. As nut 568 is prevented from rotation by vertical guide rod 576 which passes through a slot in the nut, rotation of the handwheel by the operator will cause the nut to travel up or down on screw 570 and rod 576. When the nut moves upwardly, pin 566 will cause arm 564 and gear 560 to rotate clockwise about 562 and will draw rods 554 downwardly. When nut 568 is drawn down, rods 554 will be forced upwardly, and will raise all their attached parts, including rods 58, pattern pin box 78, plate 144 attached to the lower ends of rods 558, and all parts above plate 144. When plate 144 rises it takes with it T-bars 150 and punches 56. Plate 146 and T-bars 152 are raised by the heads of bolts 166 which seat in the sockets counterbored in plate 146. As hand crank 90, gear 98, and their interconnected parts are all mounted on a vertical extension of plate 149 (Fig. 10), they also are raised with the other parts above mentioned, and the resulting condition is shown in Fig. 26 in which all parts above die plate 160 are raised sufficiently to provide ample room for access by the operator between plates 160 and 146. The frame socket in which the inner end of plunger 94 normally rests is slotted, and the plunger slides out of the slot during the above operation.

The reverse operation of handwheel 574 and rods 554 draws all parts down again to working position. Pins 168 help to guide the parts as they come together.

The machine is started in operation by depressing start key 600, and stopped manually by depressing stop key 602 (Figs. 1, 3 and 28).

Current is supplied from the outside source to our machine circuit at 604, and when key 600 is depressed current flows from left side of line 606 through motor 76, relay coil 608, contact 610, and back to source through line 612. As soon as coil 608 is energized, relay contact 614 is closed and a stick circuit is provided through motor 76, coil 608, contact 614, and by two paths from binding post 616 to binding post 618, and thence back to source through lines 620 and 612. One path is through contact 622 and machine operated contact "A", while the other is through make and break cam contacts 624 and 626. Contacts 624 and 626 are in parallel and contact 624 breaks before contact 626 breaks and contact 626 makes before contact 624 breaks.

The timing of contacts and other operations of the machine is shown in the lower diagram of Fig. 28, in which it will be seen that contact "A" makes before 626 breaks and holds contact after 624 makes. This means that when A is held open by automatic action of the machine, both "A" and the cam contacts will be open and the machine will stop at a position between the breaking of contacts 626 and the making of 624. The same is true if the machine be stopped manually by depressing stop key 602, which opens contact 622.

It is sometimes desirable to operate the machine by hand, and for that purpose we furnish the removable handwheel shown dotted in Fig. 4 and designated generally as 628. The stem of this device may be inserted through an opening in the frame and screwed into the end of the motor shaft, after which the motor, and through it the whole machine, may be turned by hand.

What we claim is:

1. In a card punching machine, means for feeding a card into punching position, a reciprocable means for removing the card therefrom and moving it to a discharge position said removing means including gripping devices with means for positively closing the same when in card receiving position and for holding the same closed during its movement from receiving to discharge position and means for reopening the same when it reaches discharge position.

2. In a card punching machine, means for feeding a card into punching position, a reciprocable means for removing the card therefrom and removing it to a discharge position, said removing means including gripping devices and means for positively closing the gripping devices at one end of the stroke and positively opening them at the other end of the stroke.

3. In a card punching machine in combination, card feeding means, a card punch, card removing means including a card gripper device, means for reciprocating said card feeding and removing devices in unison, and means causing said gripper device to close at one end of the stroke and open at the other end of the stroke.

4. In a card punching machine, means for feeding a card to the punching device, means for removing the card therefrom, said removing means including devices for gripping the forward edge of the card, means for reciprocating said card removing device, and means causing said gripper to close at one end of the stroke and open at the other end of the stroke.

5. In a machine of the class described, card perforating devices comprising upper and lower members, means operable by the machine to move said members relatively to each other in regular operative cycle, and independent devices operable to move said members out of operative relationship with each other.

6. In a machine of the class described, in combination, a die plate, a set of punches normally in operative relationship thereto, means operable by the machine to reciprocate said punches relatively to said die plate, and manually controlled means to withdraw said punches from operative relationship with said die plate to prevent punching operation.

7. In a card punching machine, in combination, a die plate, a set of punches, means for reciprocating said plate and said punches in fixed stroke relatively to each other, and manually operable devices to separate said plate and said punches a distance greater than said fixed stroke.

8. In a machine of the class described, a set of punches, a die plate, means operable by the machine to reciprocate said die plate relatively to said punches, and manually operable devices to withdraw said punches from operative relationship with said die plate to permit removal of a jammed card.

9. In a card punching machine in combination, a die plate, a set of punches operable to cooperate therewith, a guide plate for said punches, said guide plate being in close proximity to said die plate, and manually operable devices to withdraw said punches and said guide plate from close proximity to said die plate in the axial direction of said punches.

10. In a machine of the class described, in combination, means for feeding the card, apparatus for punching the card, and means for stacking the card on a discharge stack, said stacking means comprising a device for gripping the edge of the card and a device, operating simultaneously with the release of the card by the gripper, for impelling the card onto said stack.

11. In a card punching apparatus in combination, means for feeding a card, means for punching a card, means for removing the punched card to a position over a discharge receptacle, and a device operable by said card removing means, to impel the card into said discharge receptacle.

12. In a card punching apparatus in combination, means for feeding a card, means for punching a card, means for removing the punched card to a position over a discharge receptacle, and a device operable when the card is released by said card removing means to impel the card into said discharge receptacle.

13. In a machine of the class described, in combination, mechanism for punching cards, picker devices for feeding cards to said punching mechanism and means to automatically render said machine either operative or inoperative depending upon whether a card is or is not in position in said punching mechanism when said mechanism is operated by the machine, said means including a feeler device that assumes one position when a card is present and another position when a card is absent.

14. The invention set forth in claim 13, in which said feeler device controls the source of power of the machine.

15. The invention set forth in claim 13, in which the machine is electrically operated and in which the feeler device controls the source of current to the machine.

16. In a machine of the class described in combination a magazine for blank cards, a punching device, a reciprocating tiltable picker for feeding one card every machine cycle from said magazine to said punching device, and means to tilt said picker to inoperative position when a predetermined number of cards has been punched in said punching device.

17. The invention set forth in claim 16, in which devices are provided to stop the machine after the picker has been rendered inoperative.

18. The invention set forth in claim 16, in which devices are provided to stop the machine during the next succeeding machine cycle after the picker has been rendered inoperative.

19. In a machine for duplicating perforations in a pattern card, in combination, a plurality of pattern pins settable by the pattern card, a plurality of punches, a plurality of punch selectors, devices for differentially and simultaneously setting said punch selectors in accordance with the setting of said pattern pins, and settable means to render any of said punch selectors unresponsive to said selector setting devices.

20. The invention set forth in claim 19 in which the devices for setting said punch selectors are friction driven.

21. In a machine for duplicating perforations in a pattern card, in combination, a plurality of pattern pins settable by the pattern card, a plurality of punches, a plurality of punch selectors, devices comprising friction driven gears for differentially and simultaneously setting said punch selectors in accordance with the setting of said pattern pins, means settable to lock any of said gears from normal operation, and means to subsequently unlock said gears.

22. In a machine of the class described, a plurality of differentially settable punch selectors, and an insertible graduated device for setting said punch selectors.

23. In a machine of the class described, a plurality of differentially settable punch selectors, a frame member, and an insertible device for setting said punch selectors, said device being provided with a series of indexed notches suitable for engagement on said frame.

24. In a machine of the class described, in combination a card magazine, a discharge rack, means for feeding cards from one to the other, and means to maintain resilient pressure on the card being fed at a point thereon intermediate the magazine and rack.

25. In a machine of the class described, in combination, a card magazine, a card feeding device, a punching device, and means comprising springs for maintaining pressure on the card being fed from said magazine to said punch at a point intermediate the magazine and punch.

26. In a machine of the class described, in combination, card feeding devices, a card punch, card removing devices, means for reciprocating said feeding and removing devices in unison, and means for adjusting the length of stroke of said devices.

27. The invention set forth in claim 26 in which the stroke adjusting means comprises an adjustable arm in said reciprocating means.

In testimony whereof we hereto affix our signatures.

CLAIR D. LAKE.
RALPH E. PAGE.